United States Patent
Herschel et al.

(10) Patent No.: US 8,855,864 B2
(45) Date of Patent: Oct. 7, 2014

(54) METHOD FOR OPERATING AN ELECTRIC STEERING SYSTEM OF AN INDUSTRIAL TRUCK AND INDUSTRIAL TRUCK PROVIDED FOR THIS PURPOSE

(75) Inventors: Jan Herschel, Bad Oldesloe (DE); Martin Langlotz, Sparrieshoop (DE)

(73) Assignee: Jungheinrich Aktiengesellschaft (DE)

( * ) Notice: Subject to any disclaimer, the term of this patent is extended or adjusted under 35 U.S.C. 154(b) by 0 days.

(21) Appl. No.: 13/880,128

(22) PCT Filed: Oct. 13, 2011

(86) PCT No.: PCT/EP2011/005133
§ 371 (c)(1), (2), (4) Date: Apr. 18, 2013

(87) PCT Pub. No.: WO2012/052132
PCT Pub. Date: Apr. 26, 2012

(65) Prior Publication Data
US 2013/0204494 A1   Aug. 8, 2013

(30) Foreign Application Priority Data
Oct. 18, 2010   (DE) .......... 10 2010 048 958

(51) Int. Cl.
| B62D 5/04 | (2006.01) |
| B62D 5/00 | (2006.01) |
| B62D 15/02 | (2006.01) |
| B66F 9/06 | (2006.01) |

(52) U.S. Cl.
USPC .................. 701/42; 701/50

(58) Field of Classification Search
USPC .................. 701/504, 41–44, 50
See application file for complete search history.

(56) References Cited

U.S. PATENT DOCUMENTS
2003/0028306 A1*  2/2003  Fujimori .......... 701/41

FOREIGN PATENT DOCUMENTS
| EP | 1 281 598 | 2/2003 |
| EP | 1 310 419 | 5/2003 |
| EP | 1 964 752 | 9/2008 |

* cited by examiner

Primary Examiner — Khoi Tran
Assistant Examiner — Dale Moyer
(74) Attorney, Agent, or Firm — Stuart H. Mayer; Mayer & Williams PC (57) ABSTRACT

A method is provided for operating an electrical steering system of an industrial truck. An assignment assigns a target value for a rotational position of the steering wheel to each rotational position of the steered wheel. An electrical steering drive motor is provided for the steered wheel such that the detected rotational movement of the steering wheel is converted into rotational movement according to a predetermined transmission factor. An absolute value of a rotational position of the steering wheel and the steered wheel is detected during travel of the industrial truck. If the detected absolute values are related to one another according to the assignment, and if a deviation is determined, a transmission factor is specified that differs from the predetermined transmission factor for the conversion of the detected rotational movement of the steering wheel into the rotational movement of the steered wheel such that the determined deviation is automatically counteracted during the further steering movement.

19 Claims, 4 Drawing Sheets

METHOD FOR OPERATING AN ELECTRIC STEERING SYSTEM OF AN INDUSTRIAL TRUCK AND INDUSTRIAL TRUCK PROVIDED FOR THIS PURPOSE

BACKGROUND OF THE INVENTION

The invention relates to a method for operating an electrical steering system of an industrial truck which has a steering wheel and at least one steered wheel, wherein there is an assignment which assigns a target value for a rotational position of the steering wheel to each rotational position of the at least one steered wheel. With the method, a rotational movement of the steering wheel of the industrial truck is detected, and an electrical steering drive for the at least one steered wheel is actuated such that the detected rotational movement of the steering wheel is converted into a rotational movement of the at least one steered wheel according to a predetermined transmission factor. The invention also relates to an industrial truck intended for implementing the method.

With industrial trucks having a steering wheel and an electrical steering drive there is no direct mechanical connection between the steering wheel and the steered wheel. It is however desirable to have a fixed assignment between the rotational position of the steered wheel and the rotational position of the steering wheel, particularly for example, with straight-line travel in order to allow a preferred position of the steering wheel. Now, and in the following, the rotational position of the steered wheel is always considered to be the angular position relevant for the direction of travel, which is also called the steering angle.

The publication EP 1 310 419 A2 discloses different methods for aligning a steering angle sensor for an electrical steering system of an industrial truck. With the known methods, a distinction is made between an alignment phase and an operating phase of the industrial truck. The alignment phase is initiated when the industrial truck is restarted. In the alignment phase, the actual position of a steering angle sensor and the steered wheel is detected. The steering angle sensor is adjusted, without actuating the steered wheel, until it is determined that assuming a predetermined transmission ratio, a reference position of the steering angle sensor leads to a reference position of the steered wheel. Then, the operating phase is started during which actuation of the steered wheel takes place. In a variant of the known method, in the alignment phase the wheels are actuated according to a first transmission ratio until it is determined that the reference position of the steering angle sensor with a specific transmission ratio leads to the predefined position of the steered wheels, and then the operating phase is started which uses the specific transmission ratio.

Based upon this background, the object of the present invention is to provide a method for operating an electrical steering system of an industrial truck that guarantees a preferred rotational position of the steering wheel with specific steering angles, also during the ongoing operation of the industrial truck, and that can be implemented largely without the driver's knowledge, as well as an industrial truck provided for implementing the method.

SUMMARY OF THE INVENTION

This object is achieved by the method with the characteristics of claim 1. Advantageous embodiments are specified in the subsequent dependent claims.

The method serves for operating an electrical steering system of an industrial truck which has a steering wheel and at least one steered wheel, wherein there is an assignment which assigns a target value for a rotational position of the steering wheel to each rotational position of the at least one steered wheel. The method comprises the following steps:

detecting a rotational movement of the steering wheel of the industrial truck, actuating an electrical steering drive motor for the at least one steered wheel such that the measured rotational movement of the steering wheel is converted into a rotational movement of the at least one steered wheel according to a predetermined transmission factor, detecting an absolute value of a rotational position of the steering wheel during travel of the industrial truck, detecting an absolute value of a rotational position of the steered wheel during travel of the industrial truck, checking whether the detected absolute values are related to one another according to the assignment, and if a deviation is determined, specifying a transmission factor that differs from the predetermined transmission factor for the conversion of the detected rotational movement of the steering wheel into the rotational movement of the at least one steered wheel, such that the determined deviation is automatically counteracted during a further steering movement.

That there is an assignment that assigns a target value for the rotational position of the steering wheel is assigned to each rotational position of the at least one steered wheel means that a specific desired rotational position of the steering wheel corresponds to each steering angle. Several rotations of the steering wheel can be required for traversing the total range of the steering angle, such that a specific rotational position of the steering wheel is potentially assigned to several steering angles. The assignment can be in the form of a mathematical function, for example containing a reference angle for the rotational position of the steering wheel at a zero position of the rotational position of the steered wheel and a transmission ratio. For example, a steering angle of 0° corresponding to straight-line travel can be assigned a rotational position of the steering wheel of 0°, and a transmission factor with a value of 5.5 for instance, can specify that a change of the steering angle by 1° should correspond to a change of the rotational position of the steering wheel by 5.5°. Alternatively, the assignment can be made on the based on a table.

An appropriate sensor can be used for detecting the rotational movement of the steering wheel, for example an incremental encoder. Detecting the rotational movement means that a change of the rotational position is detected. Only a relative change can be detected, independent of an absolute value of the rotational position. The relative change of the rotational position is quantitatively detected, including the direction of rotation.

The electrical steering drive is actuated using a suitable electronic control. This control actuates the electrical steering drive so that a detected rotational movement of the steering wheel is converted according to the transmission ratio into a larger or smaller rotational movement of the steered wheel. For this purpose, the rotational movement of the steered wheel can be detected by a suitable sensor and the steering drive can be actuated until the detected change of the steering angle has attained the desired value. Alternatively, the steering drive can be actuated independently from the detection of the rotational movement that is actually performed.

With the invention, absolute values of a rotational position of the steering wheel and a rotational position of the steered wheel are also detected during travel of the industrial truck. It is checked whether the detected absolute values are related to one another according to the assignment. This means, that based on the detected absolute values, it is determined whether the actual values do, or do not, adhere to the desired assignment.

If a deviation is determined, a transmission factor that differs from the predetermined transmission factor is specified for the conversion of the detected rotational movement of the steering wheel into the rotational movement of the at least one steered wheel, such that during a further steering movement the determined deviation is automatically counteracted. If with the check it is determined, for example, that the detected absolute value of the steering angle is less than intended with the detected absolute value of the rotational position of the steering wheel, then with a subsequent reduction of the steering angle, a smaller transmission factor is specified so that upon rotation of the steering wheel in the appropriate direction, the steering angle is reduced less strongly than according to the usual transmission factor. In contrast, if the steering angle is further increased based on a rotation of the steering wheel, a larger transmission factor can be specified so that the steering angle is increased more strongly than with using the usual transmission factor. These measures counteract the detected deviation, that is, the steering angle is changed during further rotational movements of the steering wheel to the effect that the steering angle and rotational position of the steering wheel automatically approach the relative position intended according to the assignment.

A particular advantage of the method is that it can be implemented automatically while the industrial truck is traveling. Thus, it is not necessary to interrupt the operation. Thereby, an optimal coordination of the steering angle and the rotational position of the steering wheel is continuously ensured, for example, during an entire work shift. Thus, at any time, the operator discovers the usual and optimal relative steering wheel position for smooth operation.

In contrast, with the method known from the prior art having a preceding alignment phase, significant deviations can occur during operation, which can only be corrected in an alignment phase during a restart of the industrial truck. Therefore, the method according to the invention contributes to the smooth and reliable operation of the industrial truck.

In principle, the absolute values of the rotational position of the steering wheel and the rotational position of the steered wheel can be detected by any sensor during travel of the industrial truck. Here, it is basically possible to continuously detect the absolute values using sensors suitable for this purpose. However, the method according to the invention can also be implemented using simpler sensors that allow detecting of absolute values only at a few predetermined rotational positions, or only at a single predetermined rotational position. A sensor for detecting an absolute value can be integrated, for example, in a pivot bearing and activate only during a zero crossing. However, detecting only selected absolute values can lead to the absolute value for the rotational position of the steering wheel and the absolute value for the rotational position of the steered wheel generally not being detected simultaneously. Therefore according to one embodiment it is provided that during checking whether the detected absolute values relate to each other according to the assignment, to take into account a rotational movement of the steering wheel and/or the at least one steered wheel that occurred in the time interval between the detecting of the two absolute values. This consideration can occur for example within a control of the industrial truck, or can also be integrated into one of the sensors. A single sensor can be used, for example, for detecting the rotational movement of the steering wheel and the absolute rotational position of the steering wheel that can detect both a relative change of the rotational position and also specific predetermined absolute values. Using the named embodiment, a deviation of the relative position of the steering wheel and the steered wheel can occur then even when absolute values for the specific rotational positions can be detected only in specific driving situations.

In one embodiment, the checking whether the detected absolute values relate to each other according to the assignment, occurs by determining a target value for the rotational position of the steering wheel that is assigned to the detected absolute value of the rotational position of the steered wheel, and determination of a difference between the determined target value for the rotational position of the steering wheel and the detected absolute value of the rotational position of the steering wheel. In other words, the rotational position in which the steering wheel should be located is determined based on the detected absolute value of the rotational position of the steered wheel and the desired assignment, and the deviation herefrom is specified by calculating the difference. Based on the determined difference, this allows a simple further processing and determination of the differing transmission factor.

In one design, the differing transmission factor is determined depending on the determined difference and the direction of rotation of the detected rotational movement of the steering wheel. The differing transmission factor can be easily determined by considering the named variables. The deviation of the differing transmission factor can be quantitatively determined from the predetermined transmission factor, wherein large determined differences lead to greater adjustments of the transmission factor. In this way, the detected deviation is quickly eliminated. However, it is also possible that only a few discrete values are predetermined for the differing transmission factor, for example, a first value that is less than the predetermined transmission factor and a second value that is greater than the predetermined transmission factor. The discrete values can differ greatly from the predetermined transmission factor that is typically used. For example, the first value for the transmission factor can be selected to be 5% less than the predetermined transmission factor, and the second value can be selected to be only 4% greater than the predetermined transmission factor. It is even possible to use only a single differing transmission factor that is for example less than the predetermined transmission factor. By suitably selecting the differing transmission factors used, for example, a correction using steering movements occurring more slowly than usual can be preferred compared to a correction using steering movements occurring faster than usual.

According to one embodiment, the absolute values of the rotational position of the steering wheel and/or the at least one steered wheel are detected continuously. This requires, as already stated, suitable sensors. The advantage is that the relative rotational positions can be controlled continuously.

In one embodiment the differing transmission factor differs by less than 20% from the predetermined transmission factor. Preferably, the differing transmission factor can also differ by less than 10%, or less than 5%, from the predetermined transmission factor. A largely imperceptible correction is attained using a relatively minor difference of the transmission factor from the predetermined transmission factor. The steering angle tracks the user specifications given using the steering wheel in a way that is very similar to the use of the typical predetermined transmission factor. A detected deviation, however, is counteracted in the desired manner so that generally after a few steering movements the deviations detected before are already completely corrected.

In one embodiment the predetermined transmission factor assumes different values, particularly smaller values around a zero position, depending on the rotational position of the at least one steered wheel, independently of a detected deviation. This corresponds to a nonlinear assignment. A particularly sensitive steering can be favored at low steering angles for example. Accordingly, strong steering movements to be implemented predominantly at slower travel can be implemented using a smaller rotation of the steering wheel. With such a progressive steering behavior, the deviation is determined relative to the then applicable assignment, which considers the different transmission factor.

In one embodiment a user can specify the assignment between the rotational positions of the at least one steered wheel and the target values for a rotational position of the steering wheel, particularly by determining a reference position of the steering wheel which corresponds to a zero position of at least one steered wheel. Left-handed and right-handed drivers have different preferences for the neutral position of the steering wheel particularly with steering wheels having a knob. This can easily be taken into account using the method according to the invention. It is possible, for example, during commissioning of the industrial truck to define the present steering wheel position as the reference position, or to set such a reference position using a keystroke. With the invention, selections made in this manner are maintained during operation using the automatic correction of deviations.

In one embodiment, an automatic alignment of the rotational position of the steering wheel and/or the rotational position of the at least one steered wheel occurs before implementing the method. An alignment phase can also precede the operation of the industrial truck, as is known from the prior art. This is however not necessary with the invention because existing deviations can be corrected automatically even during operation of the industrial truck independent of a preceding alignment phase.

The object specified above is also achieved by the industrial truck with the characteristics of claim 10. Advantageous embodiments are specified in the subsequent dependent claims.

The industrial truck according to the invention has
a steering wheel,
an electrical steering drive,
at least one steered wheel,
a sensor for detecting a rotational movement of the steering wheel,
a sensor for detecting an absolute value of a rotational position of the steering wheel during travel of the industrial truck,
a sensor for detecting an absolute value of a rotational position of the at least one steered wheel during travel of the industrial truck, and
a control that is designed to actuate the electrical steering drive according to a predetermined transmission factor and to convert a detected rotational movement of the steering wheel into a rotational movement of the at least one steered wheel, wherein
an assignment is stored in the control that assigns a target value for a rotational position of the steering wheel to each rotational position of the at least one steered wheel,
the control is designed to check whether an absolute value detected by the sensor for detecting an absolute value of a rotational position of the steering wheel is related to an absolute value detected by the sensor for detecting an absolute value of a rotational position of the at least one steered wheel, according to the assignment, and if a deviation is determined during the check whether the detected absolute values are related to one another according to the assignment, the control is designed to specify a transmission factor that differs from the predetermined transmission factor for the conversion of the detected rotational movement of the steering wheel into the rotational movement of the at least one steered wheel, such that the determined deviation is automatically counteracted during a further steering movement.

With respect to the features of the industrial truck and the special advantages, reference is made to the preceding description of the corresponding method features. The sensor for detecting a rotational movement of the steering wheel and the sensor for detecting an absolute value of a rotational position of the steering wheel during travel of the industrial truck, can be a single sensor which can be integrated for example into a pivot bearing of the steering wheel. The assignment can be stored in a control in the form of a table or a mathematical function or another specification, which allows the intended check. The named special design of the control can be implemented substantially in the form of software, which runs on a control of the industrial truck.

The industrial truck can be a high-lift truck or low-lift truck, counterbalance truck or a reach truck. The industrial truck can have a driver's seat from which a driver can easily grip the steering wheel. The steering wheel can have a knob that allows large rotational angles even with gripping the steering wheel using only one hand on the knob.

In one embodiment, the sensor for detecting an absolute value of the rotational position of the steering wheel and/or the sensor for detecting an absolute value of the rotational position of the at least one steered wheel can be analog sensors which activate due to a positional change on a spiral-shaped cam. For example, distance sensors can be used which record the distance from a surface of the spiral-shaped cam. The analog sensors preferably convert the measured distance into a current or voltage that is made available at the output of the sensor. The analog sensors can have a linear characteristic curve such that the output values depend linearly on the rotational position. The distance sensor, or sensors, can detect the distance to the surface of the spiral-shaped cam in a contactless manner, or using a mechanical probe which rests against the surface of the spiral-shaped cam and is displaced corresponding to an incline of the spiral-shaped cam, wherein the displacement is detected by the sensor.

In one embodiment, the spiral-shaped cam has an axial and/or a radial incline. In the case of an axial incline, a surface of the cam assigned to the sensor is displaced in the axial direction relative to the rotational direction, that is, for example parallel to the axis of the steering wheel. In the case of a radial incline, the surface is displaced correspondingly in the radial direction.

In one embodiment, the industrial truck has an apparatus for setting at least one parameter of the assignment, particularly a reference position of the steering wheel which corresponds to a zero position of the at least one steered wheel.

BRIEF DESCRIPTION OF THE DRAWINGS

The invention is explained in greater detail below based on exemplary embodiments shown in figures. In the figures.

DETAILED DESCRIPTION OF THE INVENTION

Figure 1:
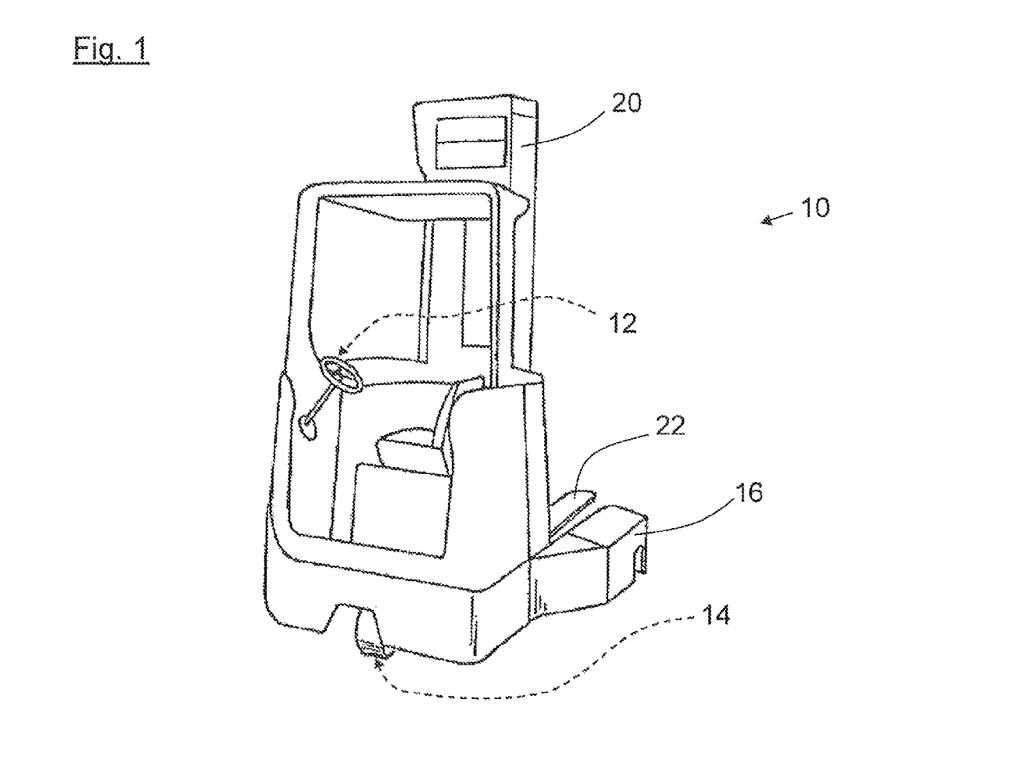
FIG. 1 shows a perspective view of an industrial truck according to the invention.

FIG. 1 shows an industrial truck 10 having a steering wheel 12 and a steered wheel 14. In addition, the industrial truck has two wheel arms 16, that run in parallel and are spaced apart from each other, each having a load wheel 18 disposed at the front end thereof. The industrial truck 10 also has a lift frame 20 having a load bearing means 22 guided thereupon, and a driver's seat 24.

Figure 2:
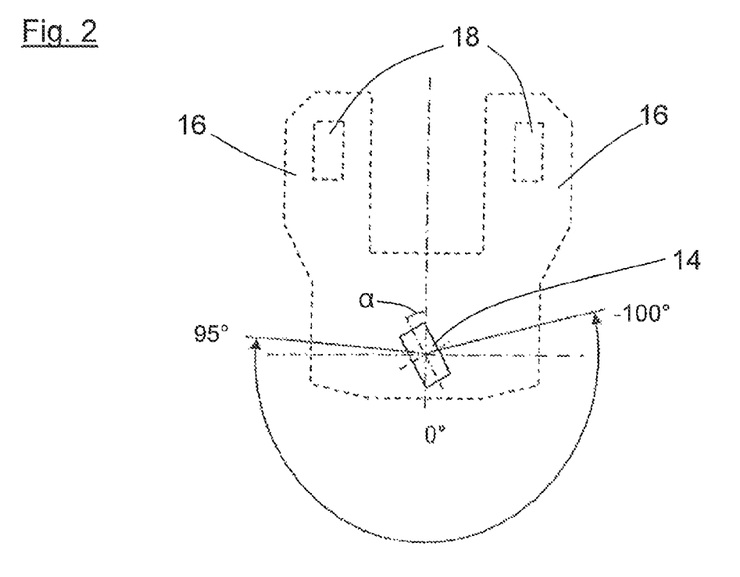
FIG. 2 shows a schematic simplified representation of the industrial truck from FIG. 1 in a view from below.

FIG. 2 schematically shows the definition of the rotational position a of the at least one steered wheel 14. The rotational position a is also called as a steering angle. This angle is measured relative to a longitudinal axis of the industrial truck. In the case of straight-line travel, the value of the rotational position $\alpha=0°$. A total value range $-100°$ to $95°$ is traversed.

Figure 3:
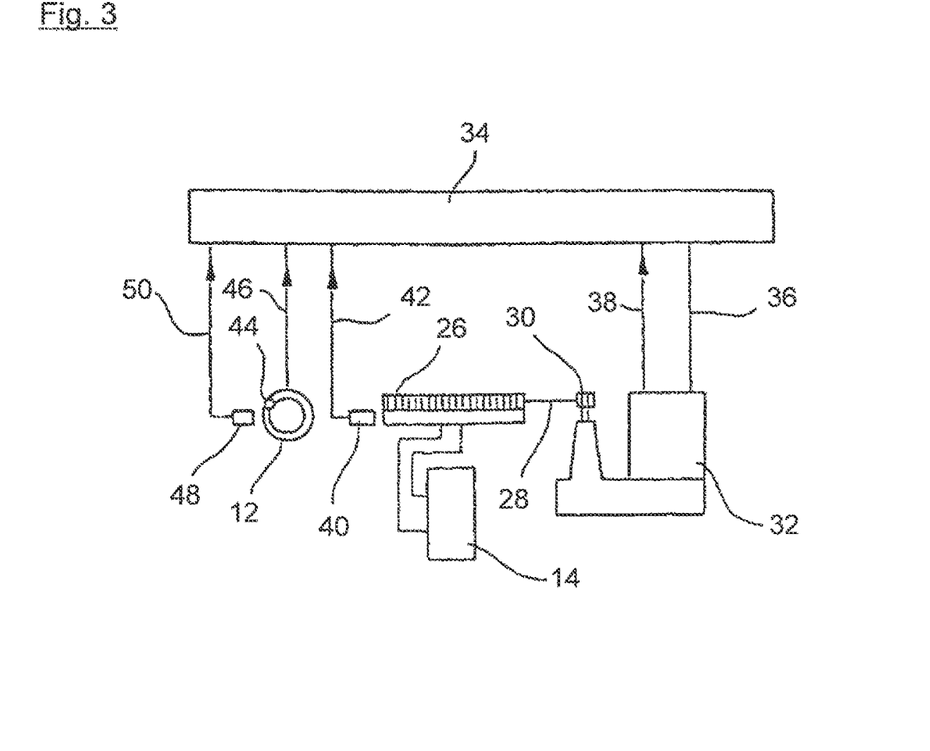
FIG. 3 shows a schematic view for the design of the electrical steering system of the industrial from FIG. 1.

FIG. 3 schematically shows that the at least one steered wheel 14 is mounted steerably at a bolster 26. The bolster 26 has a sprocket wheel that is driven by a steering drive motor 32 via a chain 28 with a pinion 30, possibly via an additional gear.

The steering drive motor 32 is actuated by a control 34 via a three-phase power supply line 36, for example. In the example, the steering drive motor 32 is equipped with a sensor bearing (not shown) that transmits information concerning the revolutions of the steering drive motor 32 to the control 34 via a further line 38.

A further sensor 40 detects an absolute value of the rotational position a of the at least one steered wheel 14, and transmits this via a line 42 to the control 34.

FIG. 3 also indicates a steering wheel 12 having a knob 44. The steering wheel 12 also has a sensor bearing (not shown), which transmits information concerning a rotational movement of the steering wheel via the line 46 to the control 34. A further sensor 48 detects an absolute value of the rotational position a of the steering wheel 12 and transmits this via a further line 50 to the control 34.

Figure 4:
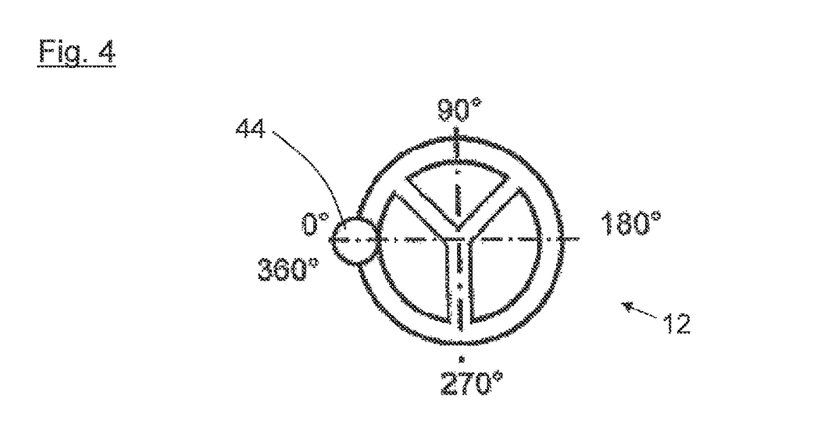
FIG. 4 shows the steering wheel of the industrial truck from FIG. 1.

FIG. 4 uses a steering wheel 12 having a knob 44 to illustrate the definition of the rotational position $\phi$ of the steering wheel 12. With a position defined as 0° the knob 44 is located on the left, with a rotational position $\phi$ of 90°, the knob 44 is located at the top, etc.

Figure 5:
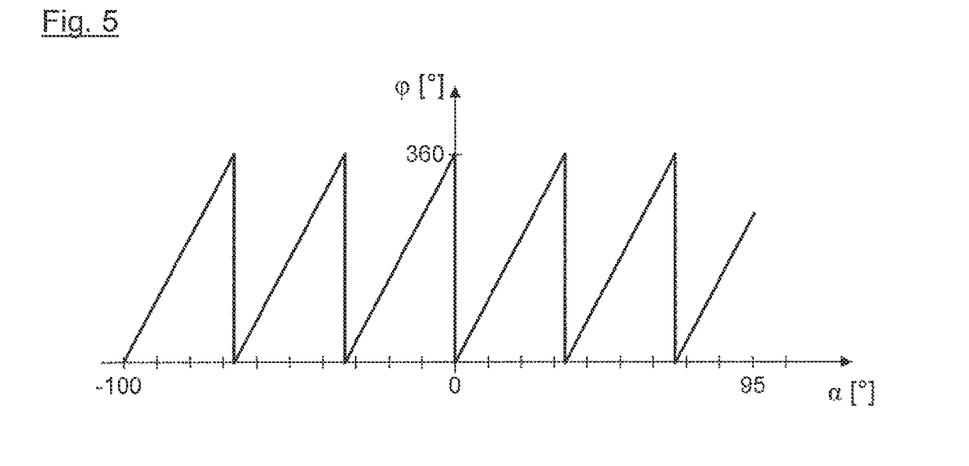
FIG. 5 shows a graph for the assignment of the rotational positions of the steering wheel to the rotational positions of the at least one steered wheel.

FIG. 5 shows an assignment of target values for the rotational position $\phi$ to possible rotational positions $\alpha$ of the at least one steered wheel 14. The value range for the rotational position $\alpha$ covers values from $-100°$ to $+95°$. Somewhat fewer than six complete rotations of the steering wheel 12 are assigned to this. The steering angle range between $-100°$ and 0° corresponds in the example to three complete rotations of the steering wheel 12, corresponding to a transmission ratio i of $3\times360°/100°=10.8$. Transmission ratios in the range of 4 to 6, particularly 5.5, for example, are also common.

As shown in FIG. 5, exactly one target value for the rotational position $\phi$ is assigned to each value of the rotational position $\alpha$. Conversely, the assignment is however not unique; a specific value of the rotational position $\phi$ of the steering wheel corresponds to several associated rotational positions $\alpha$ of the steered wheel 14.

Figure 6:
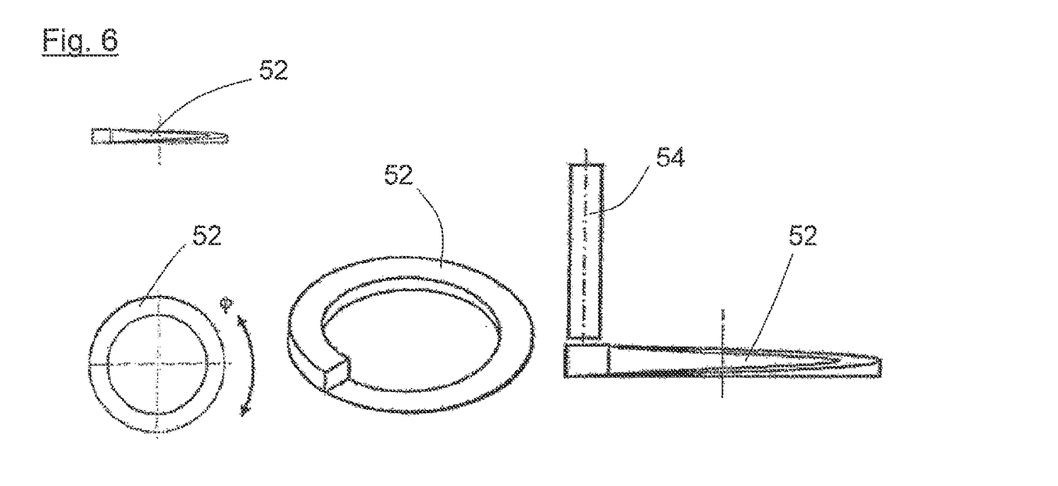
FIG. 6 shows a schematic representation of a sensor having a spiral-shaped cam with axial incline.

FIG. 6, in the upper left, shows a spiral-shaped cam in a simplified view from the side, below, and above. The cam 52 rotates together with the steering wheel 12 about an axis of rotation running perpendicular to the drawing plane, in a view from above. The rotational position of the cam 52 is therefore linked directly to the rotational position $\phi$ of the steering wheel 12. The spiral-shaped design of the cam 52 is easily identified in the perspective view shown in the center of FIG. 6. The cam 52 shown there has an axial incline. The right side of FIG. 6 shows the interaction of the cam 52 with the sensor 54, which is disposed so that the active surface thereof is facing the spiral-shaped surface of the cam 52. In this manner, the rotational position of the cam 52 can be detected without contact.

Figure 7:
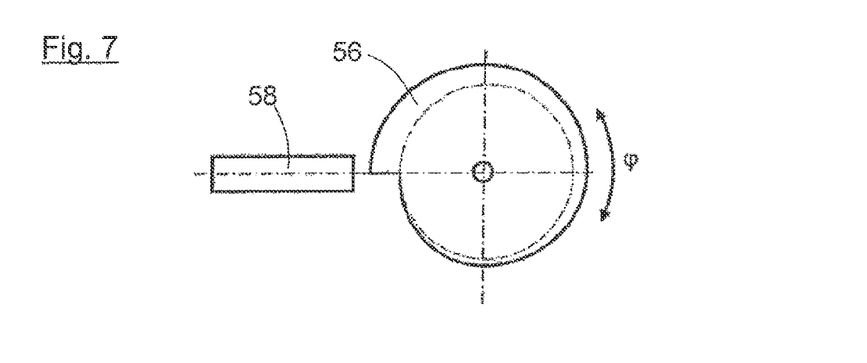
FIG. 7 shows a schematic representation of a sensor having a spiral-shaped cam with radial incline.

FIG. 7 also shows a spiral-shaped cam 56, as a further example, having a radial incline. This cam 56 also rotates together with the steering wheel 12 (or together with a steered wheel 14) and is thus linked directly to the rotational position $\phi$ of the steering wheel 12. A sensor 58 is disposed such that the active surface thereof can measure the distance to the spiral-shaped surface of the cam 56 in a contactless manner, and thus can provide information about the rotational position $\phi$ of the cam 56.

Figure 8:
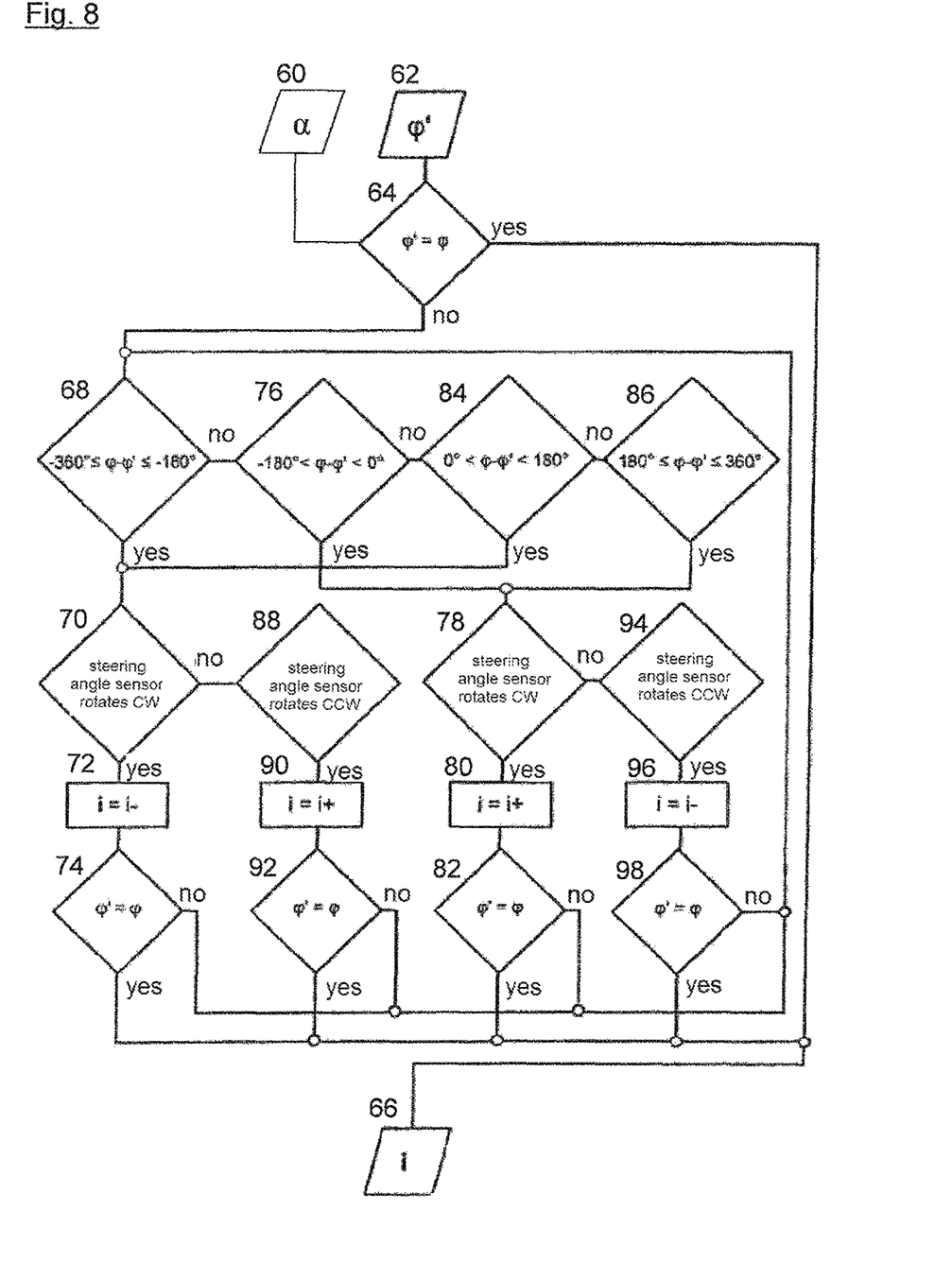
FIG. 8 shows a flow chart for the method according to the invention.

FIG. 8 shows a flow chart for the method according to the invention. The method can be performed completely during travel of the industrial truck, that is, during the regular operation of the industrial truck.

The method includes, at 60 and 62, the detecting of an absolute value for the rotational position $\alpha$ of the at least one steered wheel 14 and an absolute value $\phi'$ for the rotational position $\phi$ of the steering wheel 12. The detection in this step can occur continuously or only when passing through specific values at randomly occurring time intervals.

With 64, there is a check whether the target value for the rotational position $\phi$, which corresponds to the absolute value for the rotational position $\alpha$ of the steered wheel 12 detected at 60, given according to the assignment illustrated in FIG. 5, agrees with the detected absolute value $\phi'$, ($\phi'$ equals $\phi$?). If the values agree, the detected absolute values $\alpha$ and $\phi'$ are consistent with the assignment, and with 66, a default value as a transmission factor, also called a predetermined transmission factor i, is set.

If the values do not agree, that is, a deviation of the detected absolute values from the assignment is determined, the method continues at 68. There, the difference ($\phi-\phi'$) is formed between the target value of the rotational position $\phi$ and the detected absolute value $\phi'$, and it is checked whether this lies in the value range of $-360°$ to $-180°$. In this case, at 70 there is a determination of the present direction of rotation of the steering wheel (steering angle sensor rotates in the clockwise direction?). If the rotation is in the clockwise direction, then at 72, the transmission factor is set to a transmission factor i− differing from the predefined value. The value i− can, for example, be about 5% less than the predetermined transmission factor i. Using this setting of the differing transmission factor the deviation detected at 64 is automatically counteracted during the further progression of the steering movement. At 74, a check is performed whether the detected absolute value $\phi'$ now corresponds to the target value for the rotational position $\phi$. In this case, the method provisionally concludes at 66.

If, in step 68, the result is negative, in a further step at 76 it is checked whether the determined difference ($\phi-\phi'$) lies in the value range between $-180°$ and 0°. In this case, a further test at 76 checks whether the steering wheel 12 is rotated in the clockwise direction (steering angle sensor rotates in clockwise direction?). If this is the case, at 78, the transmission factor is set to a different transmission factor i+ that is greater, for example, by 5% than the predetermined transmission factor i. Finally, at 80, it is checked whether there is still a deviation. If this is not the case, then at 66, the transmission factor is set again to the default value thereof. Otherwise, the method continues again at step 68.

If the test at 76 determines that the detected difference ($\phi-\phi'$) does not lie within the value range between $-180°$ and $0°$, then at 84, it is checked whether the difference ($\phi-\phi'$) lies between $0°$ and $180°$. If this is the case, the method continues at step 70 that was already described. Otherwise, the method continues at step 86, with a check whether the detected difference ($\phi-o'$) lies in the range between $180°$ and $360°$. If this is the case, the method likewise continues at step 78 that was already described.

If it is determined in step 70 that the steering wheel 12 does not turn in the clockwise direction, then the further check at 88 naturally determines that a counterclockwise rotational movement is present (steering angle sensor rotates in the counterclockwise direction?). In this case, at step 90, the transmission factor is set to a larger value i+. The further test 92 corresponds to step 74 that was already described.

If it is determined in step 78 that no rotational movement in the clockwise direction is present, then at 94 the further test of the rotational movement in the counterclockwise direction (steering angle sensor rotates in the counterclockwise direction?) provides a positive answer, and at 96, the smaller, differing transmission factor i− is set as the transmission factor. The final test at 98 corresponds to step 74 that was already described.

As already described, the outlined method leads to an automatic correction of deviations between the rotational position $\alpha$ of the at least one steered wheel 12 and the associated rotational position $\phi$ of the steering wheel 12.

The invention claimed is:

1. A method for operating an electrical steering system of an industrial truck having a steering wheel and at least one steered wheel, wherein there is an assignment which assigns a target value for a rotational position ($\phi$) of the steering wheel to each rotational position ($\alpha$) of the at least one steered wheel, the method comprising:
    detecting a rotational movement of the steering wheel of the industrical truck,
    actuating an electrical steering drive motor for the at least one steered wheel such that the detected rotational movement of the steering wheel is converted into a rotational movement of the at least one steered wheel according to a predetermined transmission factor (i),
    detecting an absolute value of a rotational position ($\phi$) of the steering wheel during travel of the industrial truc,
    detecting an absolute value of a rotational position ($\alpha$) of the steered wheel during travel of the industrial truck,
    checking whether the detected absolute values are related to one another according to the assignment, and its deviation is determined,
    specifying a transmission factor (i+, i−) that differs from the predetermined transmission factor (i) for conversion of the detected rotational movement of the steering wheel into the rotational movement of the at least one steered wheel such that the determined deviation is automatically counteracted during a further steering movement, wherein the checking whether the detected absolute values relate to each other according to the assignment, occurs by determining a target value for rotational position ($\phi$) of the steering wheel that is assigned to the detected absolute value of the rotational position ($\alpha$) of the steered wheel, and determining a difference between the determined target value for the rotational position of the steering wheel and the detected absolute value of the rotational position of the steering wheel.

2. The method according to claim 1, wherein the differing transmission factor (i+, i−) is determined depending on the determined difference and the direction of rotation of the detected rotational movement of the steering wheel.

3. The method according to claim 2, wherein the absolute values of the rotational position ($\phi$) of the steering wheel and the at least one steered wheel are detected continuously.

4. The method according to claim 2, wherein the absolute values of the rotational position ($\phi$) of the steering wheel or the at least one steered wheel are detected continuously.

5. The method according to claim 1, wherein the absolute values of the rotational position ($\phi$) of the steering wheel and the at least one steered wheel are detected continuously.

6. The method according to claim 1, wherein the differing transmission factor (i+, i−) differs by less than 20% from the predetermined transmission factor (i).

7. The method according to claim 1, wherein the predetermined transmission factor (i) assumes smaller values around a zero position, depending on the rotational position ($\alpha$) of the at least one steered wheel, independently of the detected deviation.

8. The method according to claim 1, wherein a user specifies the assignment between the rotational positions ($\alpha$) of the at least one steered wheel and the target values for the rotational position ($\phi$) of the steering wheel by determining a reference position of the steering wheel which corresponds to a zero position of at least one steered wheel.

9. The method according to claim 1, wherein an automatic alignment of the rotational position ($\phi$) of the steering wheel and the rotational position ($\alpha$) of the at least one steered wheel occurs before performing the method.

10. The method according to claim 1, wherein the absolute values of the rotational position ($\phi$) of the steering wheel or the at least one steered wheel are detected continuously.

11. The method according to claim 1, wherein an automatic alignment of the rotational position ($\phi$) of the steering wheel or the rotational position ($\alpha$) of the at least one steered wheel occurs before performing the method.

12. An industrial truck, comprising:
    a steering wheel,
    an electrical steering drive motor,
    at least one steered wheel,
    a sensor for detecting a rotational movement of the steering wheel,
    a sensor for detecting an absolute value of a rotational position ($\phi$) of the steering wheel during travel of the industrial truck,
    a sensor for detecting an absolute value of a rotational position ($\alpha$) of the at least one steered wheel during travel of the industrial truck, and
    a control configured to actuate the electrical steering drive motor according to a predetermined transmission factor (i) and to convert a detected rotational movement of the steering wheel into a rotational movement of the at least one steered wheel, wherein
    an assignment is stored in the control that assigns a target value for a rotational position ($\phi$) of the steering wheel to each rotational position ($\alpha$) of the at least one steered wheel,
    the control being configured to check whether an absolute value detected by the sensor for detecting an absolute value of a rotational position (φ) of the steering wheel and an absolute value detected by the sensor for detecting an absolute value of a rotational position (α) of the at least one steered wheel are related to each other according to the assignment, and if a deviation is determined during the check whether the detected absolute values are related to one another according to the assignment, the control further being configured to specify a transmission factor (i+,i−) that differs from the predetermined transmission factor (i) for the conversion of the detected rotational movement of the steering wheel into the rotational movement of the at least one steered wheel such that the determined deviation is automatically counteracted during a further steering movement, wherein the control is further configured such that the checking whether the detected absolute values relate to each other according to the assignment, occurs by determining a target value for rotational position (φ) of the steering wheel that is assigned to the detected absolute value of the rotational position (α) of the steering wheel, and determine a difference between the determined target value for the rotational position of the steering wheel and the detected absolute value of the rotational position of the steering wheel.

13. The industrial truck according to claim 12, wherein the sensor for detecting an absolute value of the rotational position (φ) of the steering wheel and the sensor for detecting an absolute value of the rotational position (α) of the at least one steered wheel is an analog sensor which activates due to a positional change of a spiral-shaped cam.

14. The industrial truck according to claim 13, wherein the spiral-shaped cam has an axial and radial incline.

15. The industrial truck according to claim 14, wherein the industrial truck has an apparatus for setting at least one parameter of the assignment, particularly a reference position of the steering wheel which corresponds to a zero position of the at least one steered wheel.

16. The industrial truck according to claim 13, wherein the spiral-shaped cam has an axial or radial incline.

17. The industrial truck according to claim 12, wherein the industrial truck has an apparatus for setting at least one parameter of the assignment, particularly a reference position of the steering wheel which corresponds to a zero position of the at least one steered wheel.

18. The industrial truck according to claim 12, wherein the sensor for detecting an absolute value of the rotational position (φ) of the steering wheel or the sensor for detecting an absolute value of the rotational position (α) of the at least one steered wheel is an analog sensor which activates due to a positional change of a spiral-shaped cam.

19. A method for operating an electrical steering system of an industrial truck having a steering wheel and at least one steered wheel, wherein there is an assignment which assigns a target value for a rotational position (φ) of the steering wheel to each rotational position (α) of the at least one steered wheel, the method comprising:

detecting a rotational movement of the steering wheel of the industrial truck, actuating an electrical steering drive motor for the at least one steered wheel such that the detected rotational movement of the steering wheel is converted into a rotational movement of the at least one steered wheel according to a predetermined transmission factor (i), detecting an absolute value of a rotational position (φ) of the steering wheel during travel of the industrial truck, detecting an absolute value of a rotational position (α) of the steered wheel during travel of the industrial truck, checking whether the detected absolute values are related to one another according to the assignment, and if a deviation is determined, specifying a transmission factor (i+, i−) that differs from the predetermined transmission factor (i) for conversion of the detected rotational movement of the steering wheel into the rotational movement of the at least one steered wheel such that the determined deviation is automatically counteracted during a further steering movement, wherein during checking whether the detected absolute values relate to each other according to the assignment, a rotational movement of the steering wheel and/or the at least one steered wheel that occurred in the time interval between the detecting of the two absolute values, is taken into account, wherein the checking whether the detected absolute values relate to each other according to the assignment, occurs by determining a target value for rotational position (φ) of the steering wheel that is assigned to the detected absolute value of the rotational position (α) of the steered wheel, and determining a difference between the determined target value for the rotational position of the steering wheel and the detected absolute value of the rotational position of the steering wheel.

\* \* \* \* \*